(12) United States Patent
Li et al.

(10) Patent No.: US 11,983,849 B2
(45) Date of Patent: May 14, 2024

(54) IMAGE FILLING METHOD AND APPARATUS, DEVICE, AND STORAGE MEDIUM

(71) Applicant: BEIJING BAIDU NETCOM SCIENCE AND TECHNOLOGY CO., LTD., Beijing (CN)

(72) Inventors: Chao Li, Beijing (CN); Dongliang He, Beijing (CN); Fu Li, Beijing (CN); Hao Sun, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 223 days.

(21) Appl. No.: 17/203,437

(22) Filed: Mar. 16, 2021

(65) Prior Publication Data

US 2021/0201448 A1    Jul. 1, 2021

(30) Foreign Application Priority Data

Jun. 30, 2020   (CN) .......................... 202010610906.0

(51) Int. Cl.
*G06T 9/00*          (2006.01)
*G06F 18/214*     (2023.01)
(Continued)

(52) U.S. Cl.
CPC ............ *G06T 5/005* (2013.01); *G06F 18/214* (2023.01); *G06T 3/4046* (2013.01); *G06T 9/00* (2013.01);
(Continued)

(58) Field of Classification Search
CPC ......... G06T 5/005; G06T 11/40; G06T 11/60; G06T 9/00; G06T 9/002; G06T 3/4046;
(Continued)

(56) References Cited

FOREIGN PATENT DOCUMENTS

CN    111210443 A    5/2020
JP    2004193957 A    7/2004
(Continued)

OTHER PUBLICATIONS

Xian et al. "Fast generation of high-fidelity RGB-D images by deep learning with adaptive convolution" IEEE Transactions on Automation Science and Engineering 18.3: 1328-1340 (Year: 2020).*
(Continued)

*Primary Examiner* — Sumati Lefkowitz
*Assistant Examiner* — Michael Adam Shariff
(74) *Attorney, Agent, or Firm* — NORTON ROSE FULBRIGHT US LLP (57) ABSTRACT

An image filling method and apparatus, a device and a storage medium are disclosed. The image filling method includes: performing multilevel encoding processing on features of an image to be filled to generate multilevel encoded feature layers, sizes of the multilevel encoded feature layers being reduced layer by layer; performing layer-by-layer decoding processing on the multilevel encoded feature layers to obtain multilevel decoded feature layers and a first image, there being no missing region in the first image, wherein the layer-by-layer decoding processing includes a concatenation operation on a decoded feature layer and an encoded feature layer with a same size; and performing up-sampling processing on the first image to obtain multilevel up-sampled feature layers and a second image optimized by the up-sampling processing, the up-sampling processing including a concatenation operation on an up-sampled feature layer and a decoded feature layer with a same size.

18 Claims, 3 Drawing Sheets

(51) Int. Cl.
*G06T 3/4046* (2024.01)
*G06T 5/00* (2006.01)
*G06T 11/40* (2006.01)
*G06T 11/60* (2006.01)
*G06V 10/44* (2022.01)
*G06V 10/774* (2022.01)
*G06V 10/82* (2022.01)

(52) U.S. Cl.
CPC .............. *G06T 11/40* (2013.01); *G06T 11/60* (2013.01); *G06V 10/454* (2022.01); *G06V 10/774* (2022.01); *G06V 10/82* (2022.01)

(58) Field of Classification Search
CPC ............. G06T 7/73; G06T 2207/20081; G06T 2207/20084; H04N 19/00; H04N 19/70; H04N 19/119; H04N 19/102; H04N 19/10; H04N 19/30; H04N 19/33; H04N 19/134; H04N 19/157; H04N 19/105; H04N 19/17; G06N 3/0455; G06N 3/045; G06N 3/02; G06N 3/0464; G06N 3/08; G06V 10/454; G06V 30/18057; G06V 10/82; G06V 10/70; G06V 10/774; G06V 10/10; G06V 10/20; G06F 18/00; G06F 18/214
See application file for complete search history.

(56) References Cited

FOREIGN PATENT DOCUMENTS

| | | | |
|---|---|---|---|
| KR | 20190092299 | A | 8/2019 |
| WO | 2020066233 | A | 4/2020 |

OTHER PUBLICATIONS

Japanese Patent Office, Notice of Reasons for Refusal, issued in connection with JP Application No. 2021-051058, dated Mar. 8, 2022 (6 pages).

Chen, F. et al., Eigan: Enhanced Inpainting Generative Adversarial Network, IEEE International Conference on Multimedia and Expo (ICME), Jun. 9, 2020 (9 pages).

Yoshida, T. et al., Direct consciousness loss function and an indirect consciousness loss function: The verification, Information Processing Society of Japan, CVIM-217 Volume, No. 29, p. 1-8, May 23, 2019 (12 pages).

Kato, N. et al., The attribution information over one person and strange class, Institute of Electronics Information and Communication Engineers, 119th volume, No. 422, p. 189-194, Feb. 20, 2020 (10 pages).

European Patent Office, Extended European Search Report, mailed in relationship to European Application No. 21163622.0, dated Aug. 6, 2021 (10 pages).

Hong, X. et al., Deep Fusion Network For Image Completion, Multimedia, ACM, Session 4C: Social Computing & Image Processing, pp. 2033-2042, Oct. 15, 2019 (10 pages).

Xian, C. et al., Fast Generation of High Fidelity RGB-D Images by Deep-Learning With Adaptive Convolution, IEEE, Feb. 12, 2020 (13 pages).

Li, Y. et al., Fine-grained Adversarial Image Inpainting with Super Resolution, International Joint Conference on Neural Networks, Jul. 14, 2019 (8 pages).

Liu, G. et al., Image Inpainting for Irregular Holes Using Partial Convolutions, ECCV, LNCS 11215, 2018 (17 pages).

* cited by examiner

IMAGE FILLING METHOD AND APPARATUS, DEVICE, AND STORAGE MEDIUM

CROSS-REFERENCE TO RELATED APPLICATION

This application claims priority to Chinese patent application No. 202010610906.0, filed on Jun. 30, 2020, which is hereby incorporated by reference in its entirety.

TECHNICAL FIELD

The present application relates to the technical fields of artificial intelligence, deep learning, computer vision, and image filling, and more particularly, to an image filling method and apparatus, a device and a storage medium.

BACKGROUND

Image filling technologies have a wide range of applications, such as image editing, image restoration, removal of specific objects in images, and the like.

SUMMARY

The present application provides an image filling method and apparatus, a device, and a storage medium.

According to a first aspect of the present application, an image filling method is provided and includes: performing multilevel encoding processing on features of an image to be filled to generate multilevel encoded feature layers, sizes of the multilevel encoded feature layers being reduced layer by layer, wherein the image to be filled has a missing region; performing layer-by-layer decoding processing on the multilevel encoded feature layers to obtain multilevel decoded feature layers and a first image, there being no missing region in the first image, wherein the layer-by-layer decoding processing includes a concatenation operation on a decoded feature layer and an encoded feature layer with a same size; and performing up-sampling processing on the first image to obtain multilevel up-sampled feature layers and a second image optimized by the up-sampling processing, the up-sampling processing including a concatenation operation on an up-sampled feature layer and a decoded feature layer with a same size.

According to a second aspect of the present application, an image filling apparatus is provided and includes: an encoding module configured for performing multilevel encoding processing on features of an image to be filled to generate multilevel encoded feature layers, sizes of the multilevel encoded feature layers being reduced layer by layer, wherein the image to be filled has a missing region; a restoration module configured for performing layer-by-layer decoding processing on the multilevel encoded feature layers to obtain multilevel decoded feature layers and a first image, there being no missing region in the first image, wherein the layer-by-layer decoding processing includes a concatenation operation on a decoded feature layer and an encoded feature layer with a same size; and an optimization module configured for performing up-sampling processing on the first image to obtain multilevel up-sampled feature layers and a second image optimized by the up-sampling processing, the up-sampling processing including a concatenation operation on an up-sampled feature layer and a decoded feature layer with a same size.

According to a third aspect of the present application, an electronic device is provided and includes: at least one processor; and a memory communicatively connected to the at least one processor; wherein, the memory stores instructions executable by the at least one processor, and the instructions are executed by the at least one processor to enable the at least one processor to execute the method mentioned above.

According to a fourth aspect of the present application, a non-transitory computer-readable storage medium storing computer instructions for causing the computer to perform the method mentioned above is provided.

It is to be understood that the contents in this section are not intended to identify the key or critical features of the embodiments of the present application, and are not intended to limit the scope of the present application. Other features of the present application will become readily apparent from the following description.

BRIEF DESCRIPTION OF THE DRAWINGS

The drawings are included to provide a better understanding of the application and are not to be construed as limiting the application. Wherein.

DETAILED DESCRIPTION

The exemplary embodiments of the present application are described below in combination with the accompanying drawings, which include various details of the embodiments of the present application to facilitate understanding, and should be considered as merely exemplary. Accordingly, a person of ordinary skills in the art should appreciate that various changes and modifications can be made to the embodiments described herein without departing from the scope and spirit of the present application. Also, descriptions of well-known functions and structures are omitted from the following description for clarity and conciseness.

Most of the existing image filling technologies are based on block matching or texture matching, which employ common convolution neural networks for processing, and have the problems such as unrealistic filling effects, unnatural textures, obvious artificial defects and low efficiency.

Figure 1:
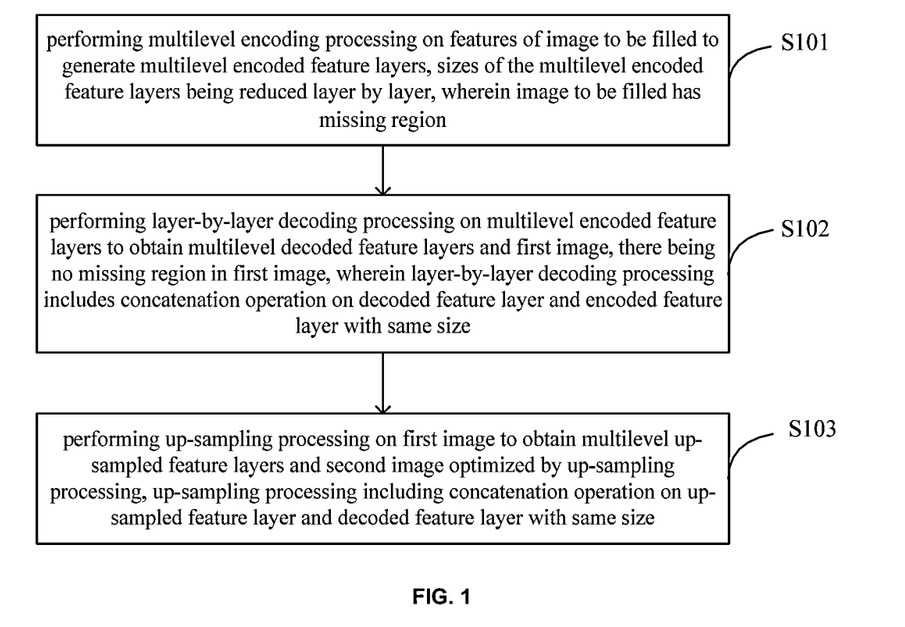
FIG. 1 is a flowchart of an image filling method according to an embodiment of the present application.

FIG. 1 illustrates a flowchart of an image filling method according to an embodiment of the present application, including the following steps:

S101: performing multilevel encoding processing on features of an image to be filled to generate multilevel encoded feature layers, sizes of the multilevel encoded feature layers being reduced layer by layer, wherein the image to be filled has a missing region;

S102: performing layer-by-layer decoding processing on the multilevel encoded feature layers to obtain multilevel decoded feature layers and a first image, there being no missing region in the first image, wherein the layer-by-layer decoding processing includes a concatenation operation on a decoded feature layer and an encoded feature layer with a same size; and S103: performing up-sampling processing on the first image to obtain multilevel up-sampled feature layers and a second image optimized by the up-sampling processing, the up-sampling processing including a concatenation operation on an up-sampled feature layer and a decoded feature layer with a same size.

In the multilevel encoding and decoding processes of the image to be filled, the embodiments of the present application can fill the missing region by using information like objects, scenes and textures in the image, and then entirely optimize the filled image. In the optimization process, up-sampling features and features of the decoded feature layers are combined. A good filling effect can be obtained in practical application.

In the embodiment of the present application, the image to be filled is an image which has a missing region, for example, a target object expected to be deleted in the image is already removed, so the image to be filled in the embodiment of the present application is not a complete image, and the missing region of the image is a region to be filled.

According to the embodiment of the present application, instead of directly filling the image to be filled by using a neural network model, the multilevel encoding processing is performed on the image to be filled which has the missing region first to obtain the multilevel encoded feature layers of the image to be filled, wherein the feature layers may include L layers, and L may be set according to specific conditions (for example, 7 layers), wherein each layer is encoded continuously based on a previous feature layer, and the sizes of the multilevel encoded feature layers are reduced layer by layer, and all the multilevel feature layers contain the features of the image to be filled. The image to be filled has the missing region. Therefore, all the multilayered feature layers carry feature information of the missing region.

Here, the missing region in the image to be filled may either be one or multiple, and one missing region will be taken as example to describe below, and the cases of multiple missing regions can be treated the same.

According to the embodiment of the present application, the obtained multilevel encoded feature layers are restored. Specifically, layer-by-layer decoding processing is performed to obtain the corresponding multilevel decoded feature layers and the first image. Here, after the multilevel encoding processing and the layer-by-layer decoding processing on the image to be filled, the missing region in the original image is actually filled in the encoding and decoding processes, so the obtained first image is a complete image without a missing region. After that, the first image is required to be optimized, that is, the filling effect is optimized.

Specifically, in the embodiment of the present application, up-sampling processing is performed on the first image to obtain multilevel up-sampled feature layers and a second image optimized by the up-sampling processing. Here, it should be noted that, when the up-sampling processing is performed, a concatenation operation is required to be performed on an up-sampled feature layer and a decoded feature layer with a same size, wherein the decoded feature layer is the fore-mentioned decoded feature layer obtained during layer-by-layer decoding.

For example, in the up-sampling process, a length and a width of each layer are transformed into k times (k is an integer, for example, twice and triple) of a length and a width of a previous layer, and features of the channel dimension are also transformed along with the length and width transformation. In addition, the embodiment of the present application needs to perform the concatenation operation on the up-sampled feature layer and the decoded feature layer with the same size. Therefore, in the optimization processing of the embodiment of the present application, the first image is taken as an input to concatenate an up-sampled layer f1 obtained by up-sampling the first image and a decoded feature layer with the same size as f1, the concatenated feature layer is taken as an input of next up-sampling, and the up-sampling processes is performed for multiple times (for example, seven times) to obtain the second image, and then the second image is the image obtained after the filling processing in the embodiment of the present application. Through the above optimization processing, the filling effect of the first image obtained by the encoding and decoding processing can be optimized to a certain extent.

In the embodiment of the present application, because the image to be filled contains information such as objects, scenes and textures, in the multilevel encoding and subsequent decoding processes of the image to be filled, the missing region can be filled by using the information such as objects, scenes and textures in the image, and then the filled image is entirely optimized. The up-sampling features and the features of the decoded feature layers are combined in the optimization process. Therefore, a good filling effect can be achieved in practical application.

Further, in the embodiment of the present application, secondary optimization may also be performed on the above optimization results. Specifically, the multilevel up-sampling processing is performed on the second image to obtain multilevel up-sampled feature layers and a third image optimized by the up-sampling processing. Here, the up-sampling processing includes a concatenation operation on an up-sampled feature layer in the current up-sampling processing and an up-sampled feature layer in the previous up-sampling processing with a same size.

That is to say, similar up-sampling processing may be performed on the fore-mentioned second image again, in which the up-sampled feature layer in the current up-sampling processing (during the second optimization) and the up-sampled feature layer in the previous up-sampling process (during the first optimization) with a same size need to be concatenated, so that the filling effect of the second image may be further optimized, and the obtained third image has a better filling effect.

With regard to the encoding processing, in an embodiment of the present application, the performing the multilevel encoding processing on the features of the image to be filled to generate the multilevel encoded feature layers, may include the following processing:

performing down-sampling processing on the image to be filled to generate multilevel down-sampled feature layers, wherein a length and a width of each down-sampled feature layer are transformed into 1/k of a length and a width of a previous down-sampled feature layer; and with regard to the encoding process, accordingly, the performing the layer-by-layer decoding processing on the multilevel encoded feature layers to obtain the multilevel decoded feature layers and the first image, may include the following processing:

performing up-sampling processing on the multilevel encoded feature layers to obtain multilevel up-sampled feature layers, wherein a length and a width of each up-sampled feature layer are transformed to k times of a length and a width of a previous up-sampled feature layer, wherein k is a positive integer.

According to the embodiment of the present application, by reasonably designing the up-sampling and down-sampling processing of the image, the image which has the missing region can be filled, and the filling effect is good.

In the embodiment of the present application, the concatenation operation on different feature layers is specifically to concatenate matrixes of two feature layers with a same size in a channel dimension. Through this concatenation, the features of two feature layers can be fused, to achieve an objective of enhancing the overall filling effect.

For example, in the embodiment of the present application, optionally, length and width dimensions of the corresponding matrices of the up-sampled feature layer and the decoded feature layer are the same, and the number of image channels is different. For example, the up-sampled feature layer is represented as a three-dimensional matrix [w, h, c1], and the decoded feature layer is represented as a three-dimensional matrix [w, h, c2], wherein w and h are length and width, respectively, c1 is the number of channels of the up-sampled feature layer, while c2 is the number of channels of the decoded feature layer. Through the operation of the feature transformation, the matrix [w, h, c1] of the up-sampled feature layer and the matrix [w, h, c2] of the decoded feature layer may be concatenated in the channel dimension to obtain a three-dimensional matrix [w, h, c1+c2], and through this concatenation processing, the features of the two can be fused, so as to achieve the objective of enhancing the overall filling effect.

In the embodiment of the present application, before the performing the multilevel encoding processing on the features of the image to be filled, preprocessing is performed to remove a target region in a target image to obtain the image to be filled, wherein the missing region in the image to be filled is a region to be filled.

Figure 2:
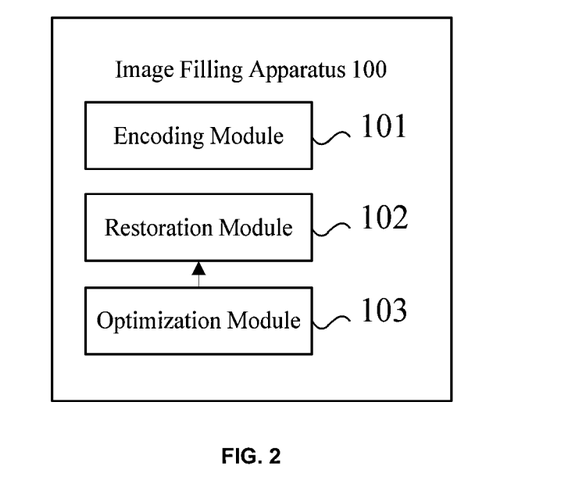
FIG. 2 is a structure block diagram of an image filling apparatus according to an embodiment of the present application.

Corresponding to the above method embodiment, an embodiment of the present application also provides an image filling apparatus 100, referring to FIG. 2, including:
  an encoding module 101 configured for performing multilevel encoding processing on features of an image to be filled to generate multilevel encoded feature layers, sizes of the multilevel encoded feature layers being reduced layer by layer, wherein the image to be filled has a missing region;
  a restoration module 102 configured for performing layer-by-layer decoding processing on the multilevel encoded feature layers to obtain multilevel decoded feature layers and a first image, there being no missing region in the first image, wherein the layer-by-layer decoding processing includes a concatenation operation on a decoded feature layer and an encoded feature layer with a same size; and
  an optimization module 103 configured for performing up-sampling processing on the first image to obtain multilevel up-sampled feature layers and a second image optimized by the up-sampling processing, the up-sampling processing including a concatenation operation on an up-sampled feature layer and a decoded feature layer with a same size.

Figure 3:
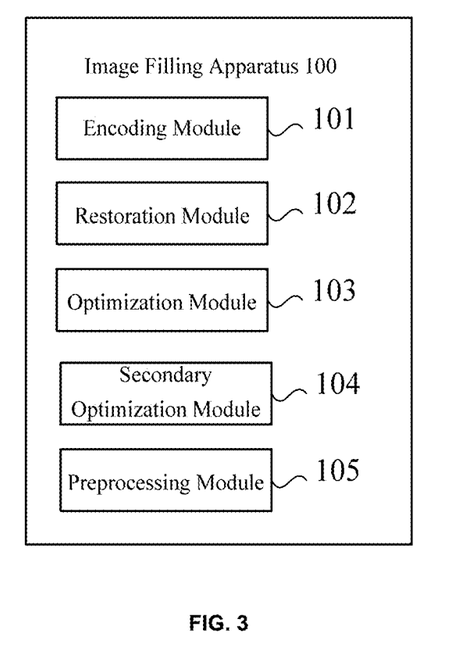
FIG. 3 is a structure block diagram of another image filling apparatus according to another embodiment of the present application.

As shown in FIG. 3, in an embodiment, the image filling apparatus 100 further includes: a secondary optimization module 104 configured for performing multilevel up-sampling processing on the second image to obtain multilevel up-sampled feature layers and a third image optimized by the up-sampling processing, the up-sampling processing including a concatenation operation on an up-sampled feature layer in the current up-sampling processing and an up-sampled feature layer in the previous up-sampling processing with a same size.

In an embodiment, the encoding module 101 includes: a down-sampling processing submodule configured for performing down-sampling processing on the image to be filled to generate multilevel down-sampled feature layers, wherein a length and a width of each down-sampled feature layer are transformed into 1/k of a length and a width of a previous down-sampled feature layer; and the restoration module 102 includes: an up-sampling processing submodule configured for performing up-sampling processing on the multilevel encoded feature layers to obtain multilevel up-sampled feature layers, wherein a length and a width of each up-sampled feature layer are transformed to k times of a length and a width of a previous up-sampled feature layer, wherein k is a positive integer.

In an embodiment, the concatenation operation of the restoration module 102 or the optimization module 103 includes: concatenating matrixes of two feature layers with a same size in a channel dimension.

In an embodiment, the image filling apparatus 100 further includes:
  a preprocessing module 105 configured for removing a target region in a target image to obtain the image to be filled, the missing region in the image to be filled being a region to be filled.

The functions of each module in the image filling apparatus 100 according to the embodiment of the present application correspond to contents described in the foregoing method embodiment, that is, each module in the image filling apparatus 100 can be used to implement each step of the foregoing image filling method, and can obtain the same beneficial technical effects.

In an embodiment, the encoding module 101, the restoration module 102, and the optimization module 103 are respectively generated by training a neural network with training data, and the training data includes the image to be filled which has the missing region and a corresponding complete image; wherein the restoration module 102 corresponds to a first loss function, the optimization module corresponds to a second loss function and a third loss function, and the secondary optimization module 104 corresponds to the first loss function, the second loss function, the third loss function and a fourth loss function, and the image filling apparatus is constructed after each of the modules is trained, wherein the first loss function is a pixel-level reconstruction loss function, the second loss function is a perceptual loss function, the third loss function is a style loss function, and the fourth loss function is a total variation loss function.

In the embodiment of the present application, neural networks (such as convolutional neural networks, cyclic neural networks, or other types of neural networks) are respectively trained by using training data, and a neural network model (the encoding module 101) capable of performing the multilevel encoding processing on the features of the image to be filled, a neural network model capable of performing the layer-by-layer decoding processing on the multilevel encoded feature layers (the restoration module 102) and a neural network model (the optimization module 103) capable of performing optimization processing on the first image can be obtained respectively.

After the training is completed, each of neural network models or modules may be logically connected to obtain the image filling apparatus 100. When in use, the image to be filled is input into the image filling apparatus and processed by each module, and then, the filled image may be output.

A plurality of loss functions adopted by the embodiments of the present application are described below.

In an embodiment of the present application, a pixel-level reconstruction loss function is employed as the first loss function, which is as follows:

$$L_{hole} = \frac{1}{N_{I_{gt}}} \|(1-M) \odot (I_{out} - I_{gt})\|_1,$$

$$L_{valid} = \frac{1}{N_{I_{gt}}} \|M \odot (I_{out} - I_{gt})\|_1$$

wherein, $L_{hole}$ represents a loss function for the missing region, $L_{valid}$ represents a loss function for an non-missing region, $N_{I_{gt}}$ represents a total number of pixels, m represents a mask, $I_{out}$ represents the filled image, and $I_{gt}$ represents a complete image.

A semantic level perceptual loss function is employed as the second loss function, which is as follows:

$$L_{perc} = \sum_{p=0}^{P-1} \frac{\left\|\psi_p^{I_{out}} - \psi_p^{I_{gt}}\right\|_1}{N_{\psi_p}^{I_{gt}}} + \sum_{p=0}^{P-1} \frac{\left\|\psi_p^{I_{com}} - \psi_p^{I_{gt}}\right\|_1}{N_{\psi_p}^{I_{gt}}}$$

wherein, $\psi$ is a pre-trained network, and $\psi_p^{I_{out}}$ an output feature after $\psi$ acts on $I_{out}$; $\psi_p^{I_{gt}}$ is an output feature after $\psi$ acts on $I_{gt}$; and p is a $p^{th}$ layer of $\psi$.

An advanced stylized loss function is employed as the third loss function, which is as follows:

$$L_{style} = \sum_{p=0}^{P-1} \frac{\left\|K_p\left((\psi_p^{I_{out}})^T(\psi_p^{I_{out}}) - (\psi_p^{I_{gt}})^T(\psi_p^{I_{gt}})\right)\right\|_1}{C_p C_p} +$$

$$\sum_{p=0}^{P-1} \frac{\left\|K_p\left((\psi_p^{I_{com}})^T(\psi_p^{I_{com}}) - (\psi_p^{I_{gt}})^T(\psi_p^{I_{gt}})\right)\right\|_1}{C_p C_p}$$

wherein, $K_p(x)=x/(C_p \times W_p \times H_p)$, while $C_p$, $W_p$, and $H_p$ are the number of channels, a length, and a width of the $p^{th}$ layer in the $\psi$ network, respectively.

A total variation loss function is employed as the fourth loss function, which is as follows:

$$L_{tv} = \sum_{(i,j)\in R, (i,j+1)\in R} \frac{\left\|I_{com}^{i,j+1} - I_{com}^{i,j}\right\|_1}{N_{I_{com}}} + \sum_{(i,j)\in R, (i+1,j)\in R} \frac{\left\|I_{com}^{i+1,j} - I_{com}^{i,j}\right\|_1}{N_{I_{com}}}$$

wherein, $I_{com}$ is the combined image, a corresponding part in an network output image is taken as the region to be filled, and a corresponding part in the complete image is taken as the other region, $I_{com}^{i,j}$ is a pixel in an $i^{th}$ row and a $j^{th}$ column in the image, and N is a total number of pixels.

During training, a restoration network may be trained first and the pixel-level reconstruction loss function is employed. After training, a first optimization network is added, and the semantic-level perceptual loss function and the advanced stylized loss function are employed. After training, a second optimization network is added, and the pixel-level reconstruction loss function, the semantic-level perceptual loss function, the advanced stylized loss function, and the total variation loss function are employed. After training, a whole model is formed, and the filled image may be output.

The embodiment of the present application specially designs the above four loss functions and the use mode in training, which can maximize the optimization of the filling effect of the final model and make the filling effect more vivid, real and natural.

Figure 4:
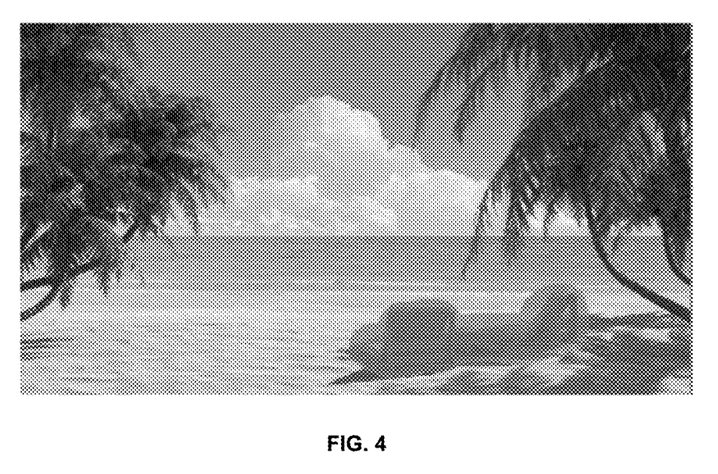
FIG. 4 is an exemplary image to be filled according to an embodiment of the present application.

Referring to FIG. 4, an image to be filled according to an embodiment of the present application is schematically illustrated. For convenience of description, objects expected to be removed, i.e., a pair of recliners on a beach, are marked in color in FIG. 4.

According to the image filling method of the embodiment of the present application, optionally, the preprocessing module may preprocess the target image: removing the target region in the target image to obtain the image to be filled, wherein the missing region in the image to be filled is the region to be filled.

In the embodiment shown in FIG. 4, a target original image is a beach picture containing the recliners, and the recliners can be cutout from the original picture by known image segmentation techniques (such as edge segmentation and semantic segmentation) to obtain an image to be filled which has a missing region, that is, a beach image without a recliner region, and the missing region is just the region to be filled.

Figure 5:
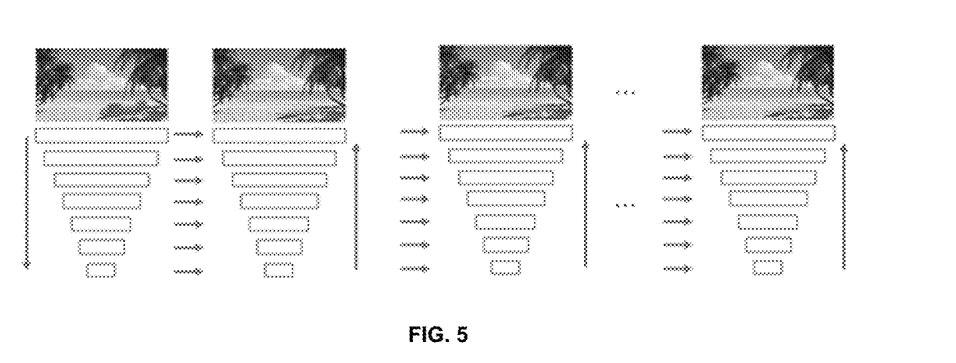
FIG. 5 is a logic process diagram of an image filling method according to an embodiment of the present application.

FIG. 5 schematically illustrates a logic process diagram of an image filling method according to an embodiment of the present application. Referring to FIG. 5, firstly, an encoding module performs multilevel encoding processing on features of an image to be filled to generate multilevel encoded feature layers, sizes of the multilevel encoded feature layers being reduced layer by layer. Optionally, the processing may be realized by down-sampling encoding. As mentioned above, a length and a width of each layer are transformed into 1/k of a length and a width of a previous layer (k is a positive integer, for example, ½, ⅓, etc.), and features of a channel dimension are also transformed along with the length and width transformation.

Then, a restoration module performs layer-by-layer decoding processing on the multilevel encoded feature layers to obtain multilevel decoded feature layers and a first image, wherein there is no missing region in the first image, and the layer-by-layer decoding processing includes a concatenation operation on a decoded feature layer and an encoded feature layer with a same size. Optionally, the restoration processing may be understood as an inverse process of the encoding process, that is, the up-sampling process, in which the length and the width of each layer are transformed into, for example, twice of those of a previous layer. Meanwhile, the features of the channel dimension are also transformed along with the length and width transformation, wherein processing objects of each layer include: 1) outputs f1 of the previous layer of the decoding module and 2) features f2 of the layer with the same length and width as f1 in the encoding module, and then f1 and f2 are concatenated in the channel dimension, thus decoding each encoded feature layer by layer.

Figure 6:
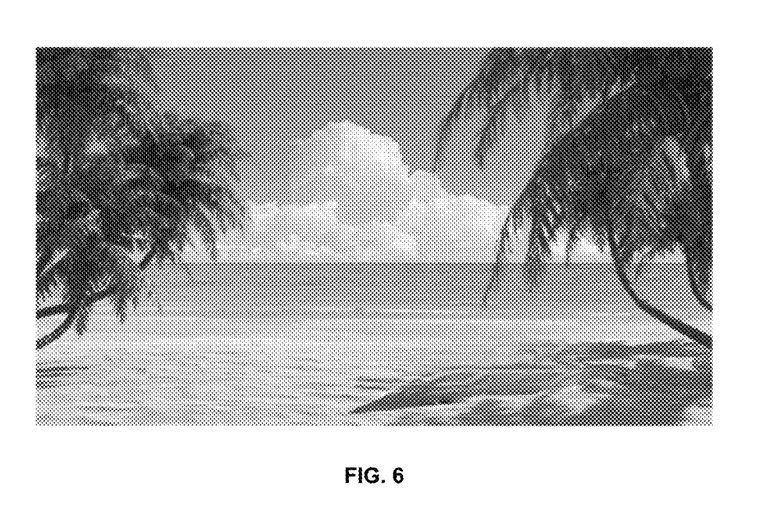
FIG. 6 is a schematic image obtained by performing image filling processing on the embodiment of FIG. 4.

Here, because the beach image to be filled contains scenes, objects, textures and other information except for the missing region, such as a sea, a beach, a tree, a reflection of the tree, or the like, all the scene information around the missing region can be carried in the above encoding and restoration processes, and a complete image obtained based on this will complement at least one of the followings: the sea, the beach, the tree, the reflection of the tree, or the like, so that the complete image is obtained preliminarily. Then, the image can be optimized by a multilevel optimization module. FIG. 6 schematically illustrates an optimized image. It can be seen that the filling of the corresponding region of the recliners in FIG. 6 fuses features of the beach and the reflection of the tree, and a filling effect is real and natural.

Figure 7:
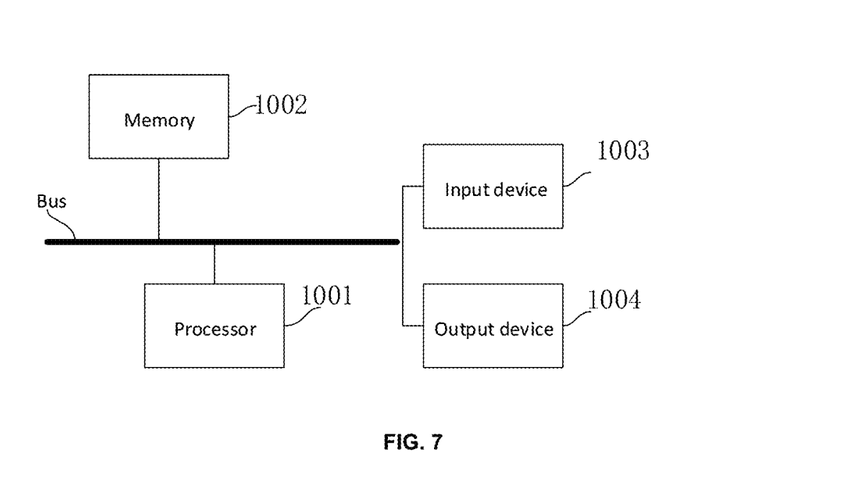
FIG. 7 is a block diagram of an electronic device for implementing an image filling method according to an embodiment of the present application.

According to the embodiments of the present application, the present application also provides an electronic device and a readable storage medium. FIG. 7 is a block diagram of an electronic device for implementing an image filling method according to an embodiment of the present application. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital assistants, cellular telephones, smart phones, wearable devices, and other similar computing devices. The components shown herein, their connections and relationships, and their functions are by way of example only and are not intended to limit the implementations of the present application described and/or claimed herein.

As shown in FIG. 7, the electronic device includes: one or more processors 1001, a memory 1002, and interfaces for connecting various components, including high-speed interfaces and low-speed interfaces. The various components are interconnected using different buses and may be mounted on a common motherboard or otherwise as desired. The processor may process instructions for execution within the electronic device, including instructions stored in the memory or on the memory to display graphical information of a Graphical User Interface (GUI) on an external input/output device, such as a display device coupled to the interface. In other embodiments, multiple processors and/or multiple buses and multiple memories may be used with multiple memories if desired. Similarly, multiple electronic devices may be connected, each providing part of the necessary operations (e.g., as an array of servers, a set of blade servers, or a multiprocessor system). In FIG. 7, one processor 1001 is taken as example.

The memory 1002 is a non-transitory computer-readable storage medium provided by the present application. The memory stores instructions executable by at least one processor to enable the at least one processor to execute the image filling method provided by the present application. The non-transitory computer-readable storage medium of the present application stores computer instructions for enabling a computer to execute the image filling method provided by the present application.

The memory 1002, as a non-transitory computer-readable storage medium, may be used to store non-transitory software programs, non-transitory computer-executable programs, and modules, such as program instructions/modules corresponding to the image filling method in the embodiment of the present application. The processor 1001 executes various functional applications of the server and data processing, i.e., implementing the image filling method in the above-mentioned method embodiment, by operating non-transitory software programs, instructions, and modules stored in the memory 1002.

The memory 1002 may include a program storage area and a data storage area, wherein the program storage area may store an application program required by an operating system and at least one function; and the data storage area may store data created according to the use of the electronic device for the image filling method, etc. In addition, the memory 1002 may include a high speed random access memory, and may also include a non-transitory memory, such as at least one magnetic disk storage device, a flash memory device, or other non-transitory solid state memory device. In some embodiments, the memory 1002 may optionally include memories remotely located with respect to the processor 1001, which may be connected via a network to the foregoing electronic device. Examples of such networks include, but are not limited to, the Internet, intranet, local area networks, mobile communication networks, and combinations thereof.

The electronic device corresponding to the image filling method according to the embodiment of the present application may further include: an input device 1003 and an output device 1004. The processor 1001, the memory 1002, the input device 1003, and the output device 1004 may be connected via a bus or otherwise. The embodiment shown in FIG. 7 of the present application takes a bus connection as an example.

The input device 1003 may receive input numeric or character information and generate key signal inputs related to user settings and functional controls of the foregoing electronic device, such as input devices including touch screens, keypads, mice, track pads, touch pads, pointing sticks, one or more mouse buttons, trackballs, joysticks, etc. The output device 1004 may include display devices, auxiliary lighting devices (e.g., LEDs), tactile feedback devices (e.g., vibration motors), and the like. The display device may include, but is not limited to, a Liquid Crystal Display (LCD), a Light Emitting diode (LED) display, and a plasma display. In some embodiments, the display device may be a touch screen.

Various embodiments of the systems and techniques described herein may be implemented in digital electronic circuit systems, integrated circuit systems, Application Specific Integrated Circuits (ASICs), computer hardware, firmware, software, and/or combinations thereof. These various embodiments may include: implementation in one or more computer programs which can be executed and/or interpreted on a programmable system including at least one programmable processor, and the programmable processor may be a dedicated or general-purpose programmable processor which may receive data and instructions from, and transmit data and instructions to, a memory system, at least one input device, and at least one output device.

These computing programs (also referred to as programs, software, software applications, or codes) include machine instructions of a programmable processor, and may be implemented using high-level procedural and/or object-oriented programming languages, and/or assembly/machine languages. As used herein, the terms "machine-readable medium" and "computer-readable medium" refer to any computer program product, apparatus, and/or device (e.g., magnetic disk, optical disk, memory, programmable logic device (PLD)) for providing machine instructions and/or data to a programmable processor, including a machine-readable medium that receives machine instructions as machine-readable signals. The term "machine-readable signal" refers to any signal used to provide machine instructions and/or data to a programmable processor.

To provide an interaction with a user, the systems and techniques described herein may be implemented on a computer having: a display device (e.g., a Cathode Ray Tube (CRT) or Liquid Crystal Display (LCD) monitor) for displaying information to a user; and a keyboard and a pointing device (e.g., a mouse or a trackball) by which a user can provide input to the computer. Other types of devices may also be used to provide interaction with a user; for example, the feedback provided to the user may be any form of sensory feedback (e.g., visual feedback, audile feedback, or tactile feedback); and input from the user may be received in any form, including acoustic input, audio input, or tactile input.

The systems and techniques described herein may be implemented in a computing system that includes a background component (e.g., as a data server), or a computing system that includes a middleware component (e.g., an application server), or a computing system that includes a front-end component (e.g., a user computer having a graphical user interface or a web browser through which a user may interact with embodiments of the systems and techniques described herein), or in a computing system that includes any combination of such background component, middleware component, or front-end component. The components of the system may be interconnected by digital data communication (e.g., a communication network) of any form or medium. Examples of the communication network include: Local Area Network (LAN), Wide Area Network (WAN), and the Internet.

The computer system may include a client and a server. The client and the server are typically remote from each other and typically interact through a communication network. A relationship between the client and the server is generated by computer programs operating on respective computers and having a client-server relationship with each other. The server can be a cloud server, also known as a cloud computing server or a cloud host, which is a host product in a cloud computing service system, to solve the defects of difficult management and weak business scalability in a traditional physical host and a VPS service ("Virtual Private Server", or "VPS" for short).

It will be appreciated that the various forms of flow, reordering, adding or removing steps shown above may be used. For example, the steps recited in the present application may be performed in parallel or sequentially or may be performed in a different order, so long as the desired results of the technical solutions disclosed in the present application can be achieved, and no limitation is made herein.

The above-mentioned embodiments are not to be construed as limiting the scope of protection of the present application. It will be apparent to a person skilled in the art that various modifications, combinations, sub-combinations and substitutions are possible, depending on design requirements and other factors. Any modifications, equivalents, and improvements within the spirit and principles of this application are intended to be included within the scope of protection of the present application.

What is claimed is:

1. An image filling method, comprising:
   performing multilevel encoding processing on features of an image to be filled to generate multilevel encoded feature layers, sizes of the multilevel encoded feature layers being reduced layer by layer, wherein the image to be filled has a missing region;
   performing layer-by-layer decoding processing on the multilevel encoded feature layers to obtain multilevel decoded feature layers and a first image, there being no missing region in the first image, wherein the layer-by-layer decoding processing comprises a concatenation operation on a decoded feature layer of the multilevel decoded feature layers and an encoded feature layer of the multilevel encoded feature layers with a same size as the decoded feature layer; and
   performing up-sampling processing on the first image to obtain first multilevel up-sampled feature layers and a second image optimized by the up-sampling processing, the up-sampling processing comprising a concatenation operation on an up-sampled feature layer of the first multilevel up-sampled feature layers and a decoded feature layer of the multilevel decoded feature layers with a same size as the up-sampled feature layer, wherein the first image is taken as an input to concatenate a first up-sampled feature layer of the first multilevel up-sampled feature layers obtained by up-sampling the first image and a decoded feature layer of the multilevel decoded feature layers with the same size as the first up-sampled feature layer, a concatenated feature layer is taken as an input of next up-sampling, and up-sampling processes is performed for multiple times to obtain the second image.

2. The method of claim 1, further comprising:
   performing multilevel up-sampling processing on the second image to obtain second multilevel up-sampled feature layers and a third image optimized by the up-sampling processing, the up-sampling processing comprising a concatenation operation on an up-sampled feature layer of the second multilevel up-sampled feature layers in the current up-sampling processing and an up-sampled feature layer of the first multilevel up-sampled feature layers in the previous up-sampling processing with a same size as the up-sampled feature layer of the second multilevel up-sampled feature layers.

3. The method of claim 1, wherein,
   the performing the multilevel encoding processing on the features of the image to be filled to generate the multilevel encoded feature layers, comprises: performing down-sampling processing on the image to be filled to generate multilevel down-sampled feature layers, wherein a length and a width of each down-sampled feature layer are transformed into 1/k of a length and a width of a previous down-sampled feature layer; and
   the performing the layer-by-layer decoding processing on the multilevel encoded feature layers to obtain the multilevel decoded feature layers and the first image, comprises: performing up-sampling processing on the multilevel encoded feature layers to obtain multilevel up-sampled feature layers, wherein a length and a width of each up-sampled feature layer are transformed to k times of a length and a width of a previous up-sampled feature layer, wherein k is a positive integer.

4. The method of claim 1, wherein, the concatenation operation comprises: concatenating a matrix of a decoded feature layer of the multilevel decoded feature layers and a matrix of an encoded feature layer of the multilevel encoded feature layers with a same size as the decoded feature layer in a channel dimension, and
   concatenating a matrix of an up-sampled feature layer of the first multilevel up-sampled feature layers and a matrix of a decoded feature layer of the multilevel decoded feature layers with a same size as the up-sampled feature layer in a channel dimension.

5. The method of claim 1, wherein before the performing the multilevel encoding processing on the features of the image to be filled, the method further comprises:
removing a target region in a target image to obtain the image to be filled, the missing region in the image to be filled being a region to be filled.

6. The method of claim 1, wherein,
the multilevel encoding processing, the layer-by-layer decoding processing, and the up-sampling processing are respectively executed by an encoding module, a restoration module and an optimization module;
wherein the encoding module, the restoration module, and the optimization module are respectively generated by training a neural network with training data, and the training data comprises the image to be filled which has the missing region and a corresponding complete image; wherein the restoration module corresponds to a first loss function, the optimization module corresponds to a second loss function and a third loss function, and a secondary optimization module corresponds to the first loss function, the second loss function, the third loss function and a fourth loss function, and an image filling apparatus is constructed after each of the modules is trained, wherein:
the first loss function is a pixel-level reconstruction loss function, the second loss function is a perceptual loss function, the third loss function is a style loss function, and the fourth loss function is a total variation loss function.

7. An image filling apparatus, comprising:
a processor and a memory for storing one or more computer programs executable by the processor,
wherein when executing at least one of the computer programs, the processor is configured to perform operations comprising:
performing multilevel encoding processing on features of an image to be filled to generate multilevel encoded feature layers, sizes of the multilevel encoded feature layers being reduced layer by layer, wherein the image to be filled has a missing region;
performing layer-by-layer decoding processing on the multilevel encoded feature layers to obtain multilevel decoded feature layers and a first image, there being no missing region in the first image, wherein the layer-by-layer decoding processing comprises a concatenation operation on a decoded feature layer of the multilevel decoded feature layers and an encoded feature layer of the multilevel encoded feature layers with a same size as the decoded feature layer; and
performing up-sampling processing on the first image to obtain first multilevel up-sampled feature layers and a second image optimized by the up-sampling processing, the up-sampling processing comprising a concatenation operation on an up-sampled feature layer of the first multilevel up-sampled feature layers and a decoded feature layer of the multilevel decoded feature layers with a same size as the up-sampled feature layer, wherein the first image is taken as an input to concatenate a first up-sampled feature layer of the first multilevel up-sampled feature layers obtained by up-sampling the first image and a decoded feature layer of the multilevel decoded feature layers with the same size as the first up-sampled feature layer, a concatenated feature layer is taken as an input of next up-sampling, and up-sampling processes is performed for multiple times to obtain the second image.

8. The apparatus of claim 7, wherein when executing at least one of the computer programs, the processor is further configured to perform operations comprising:
performing multilevel up-sampling processing on the second image to obtain second multilevel up-sampled feature layers and a third image optimized by the up-sampling processing, the up-sampling processing comprising a concatenation operation on an up-sampled feature layer of the second multilevel up-sampled feature layers in the current up-sampling processing and an up-sampled feature layer of the first multilevel up-sampled feature layers in the previous up-sampling processing with a same size as the up-sampled feature layer of the second multilevel up-sampled feature layers.

9. The apparatus of claim 7, wherein when executing at least one of the computer programs, the processor is further configured to perform operations comprising
performing down-sampling processing on the image to be filled to generate multilevel down-sampled feature layers, wherein a length and a width of each down-sampled feature layer are transformed into 1/k of a length and a width of a previous down-sampled feature layer; and
performing up-sampling processing on the multilevel encoded feature layers to obtain multilevel up-sampled feature layers, wherein a length and a width of each up-sampled feature layer are transformed to k times of a length and a width of a previous up-sampled feature layer, wherein k is a positive integer.

10. The apparatus of claim 7, wherein, the concatenation operation comprises: concatenating a matrix of a decoded feature layer of the multilevel decoded feature layers and a matrix of an encoded feature layer of the multilevel encoded feature layers with a same size as the decoded feature layer in a channel dimension, and
concatenating a matrix of an up-sampled feature layer of the first multilevel up-sampled feature layers and a matrix of a decoded feature layer of the multilevel decoded feature layers with a same size as the up-sampled feature layer in a channel dimension.

11. The apparatus of claim 7, wherein when executing at least one of the computer programs, the processor is further configured to perform operations comprising:
removing a target region in a target image to obtain the image to be filled, the missing region in the image to be filled being a region to be filled.

12. The apparatus of claim 7, wherein when executing at least one of the computer programs, the processor is further configured to perform operations comprising:
training a neural network with training data, and the training data comprises the image to be filled which has the missing region and a corresponding complete image; wherein a restoration neural network corresponds to a first loss function, an optimization neural network corresponds to a second loss function and a third loss function, and a secondary optimization neural network corresponds to the first loss function, the second loss function, the third loss function and a fourth loss function, and the image filling apparatus is constructed after the training, wherein:
the first loss function is a pixel-level reconstruction loss function, the second loss function is a perceptual loss function, the third loss function is a style loss function, and the fourth loss function is a total variation loss function.

13. A non-transitory computer-readable storage medium storing computer instructions for causing the computer to perform the method according to claim 1.

14. A non-transitory computer-readable storage medium storing computer instructions for causing the computer to perform the method according to claim 2.

15. A non-transitory computer-readable storage medium storing computer instructions for causing the computer to perform the method according to claim 3.

16. A non-transitory computer-readable storage medium storing computer instructions for causing the computer to perform the method according to claim 4.

17. A non-transitory computer-readable storage medium storing computer instructions for causing the computer to perform the method according to claim 5.

18. A non-transitory computer-readable storage medium storing computer instructions for causing the computer to perform the method according to claim 6.

* * * * *